(12) United States Patent
Homola et al.

(10) Patent No.: US 6,248,395 B1
(45) Date of Patent: Jun. 19, 2001

(54) MECHANICAL TEXTURING OF GLASS AND GLASS-CERAMIC SUBSTRATES

(75) Inventors: Andrew M. Homola, Morgan Hill; Javier Wong, San Francisco, both of CA (US)

(73) Assignee: Komag, Inc., San Jose, CA (US)

(*) Notice: Subject to any disclaimer, the term of this patent is extended or adjusted under 35 U.S.C. 154(b) by 0 days.

(21) Appl. No.: 09/316,974

(22) Filed: May 24, 1999

(51) Int. Cl.⁷ .................................. B05D 5/12
(52) U.S. Cl. ..................... 427/129; 427/128; 427/307
(58) Field of Search ..................... 427/128–132; 1/307

(56) References Cited

U.S. PATENT DOCUMENTS

| 5,249,395 | * 10/1993 | Yoshida . | |
|---|---|---|---|
| 5,598,267 | 1/1997 | Sambles et al. | 356/369 |
| 5,626,970 | 5/1997 | Hedgcoth | 428/611 |
| 5,733,178 | 3/1998 | Ohishi | 451/41 |
| 5,766,279 | 6/1998 | Ueda et al. | 51/308 |

* cited by examiner

Primary Examiner—Bernard Pianalto

(57) ABSTRACT

A method for polishing a glass or glass ceramic substrate comprises the step of using a slurry comprising both diamond and $CeO_2$ particles. We have discovered that the presence of both diamond and $CeO_2$ particles permits one to polish at a high glass removal rate, and concurrently, to leave a texture on the surface of the glass substrate.

43 Claims, 6 Drawing Sheets

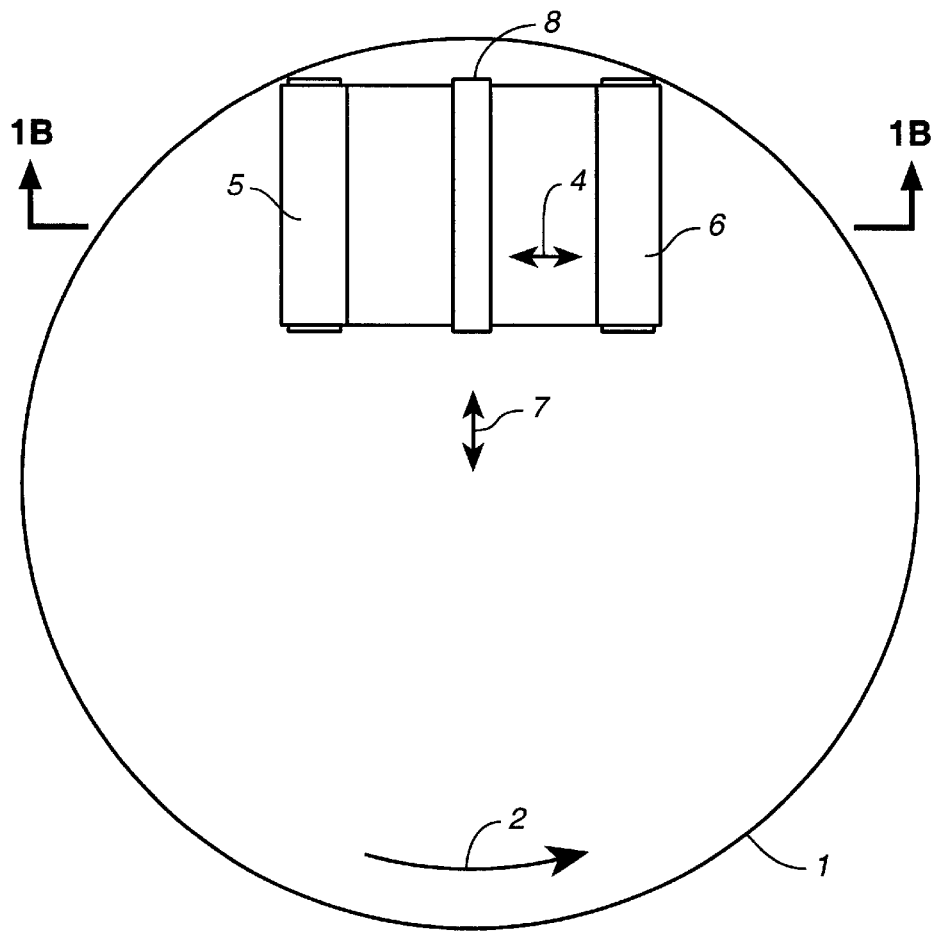
FIG._1A
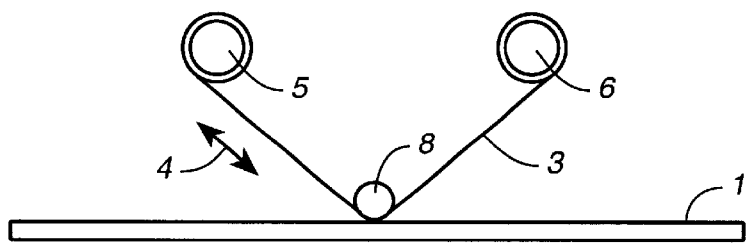
FIG._1B

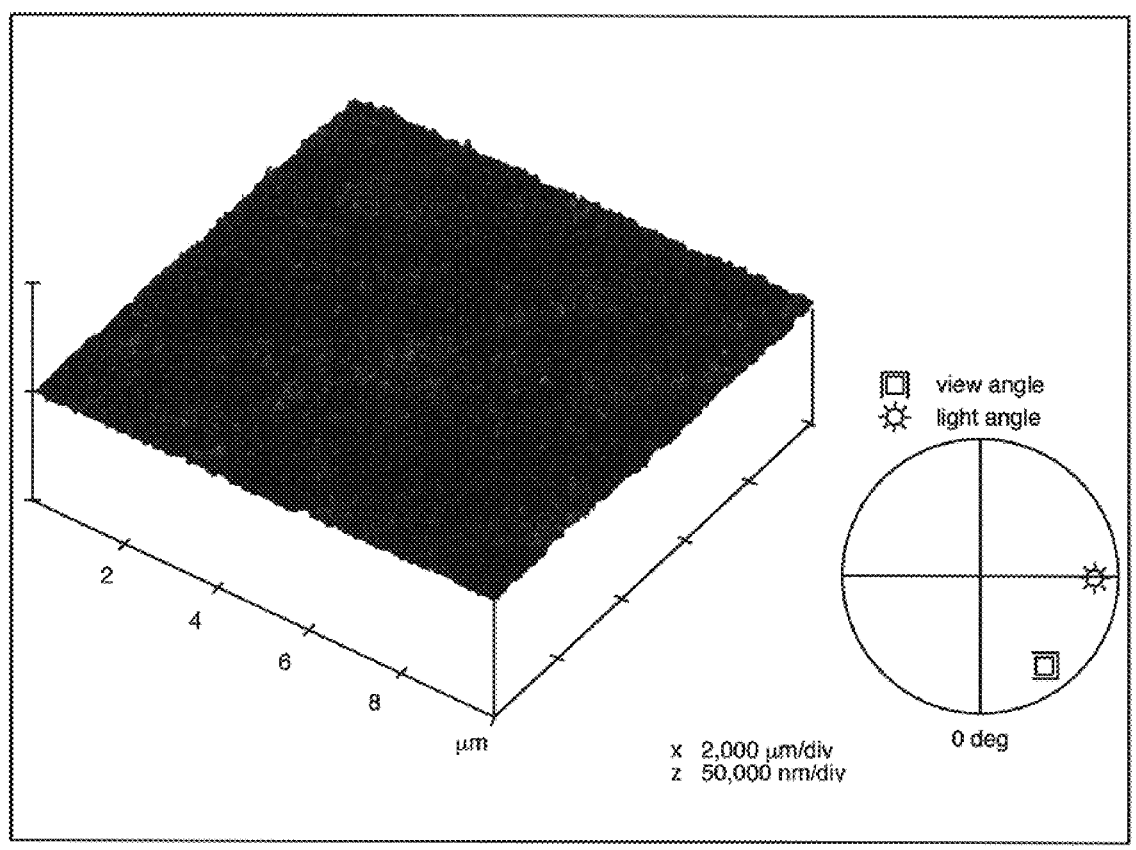
FIG._2A

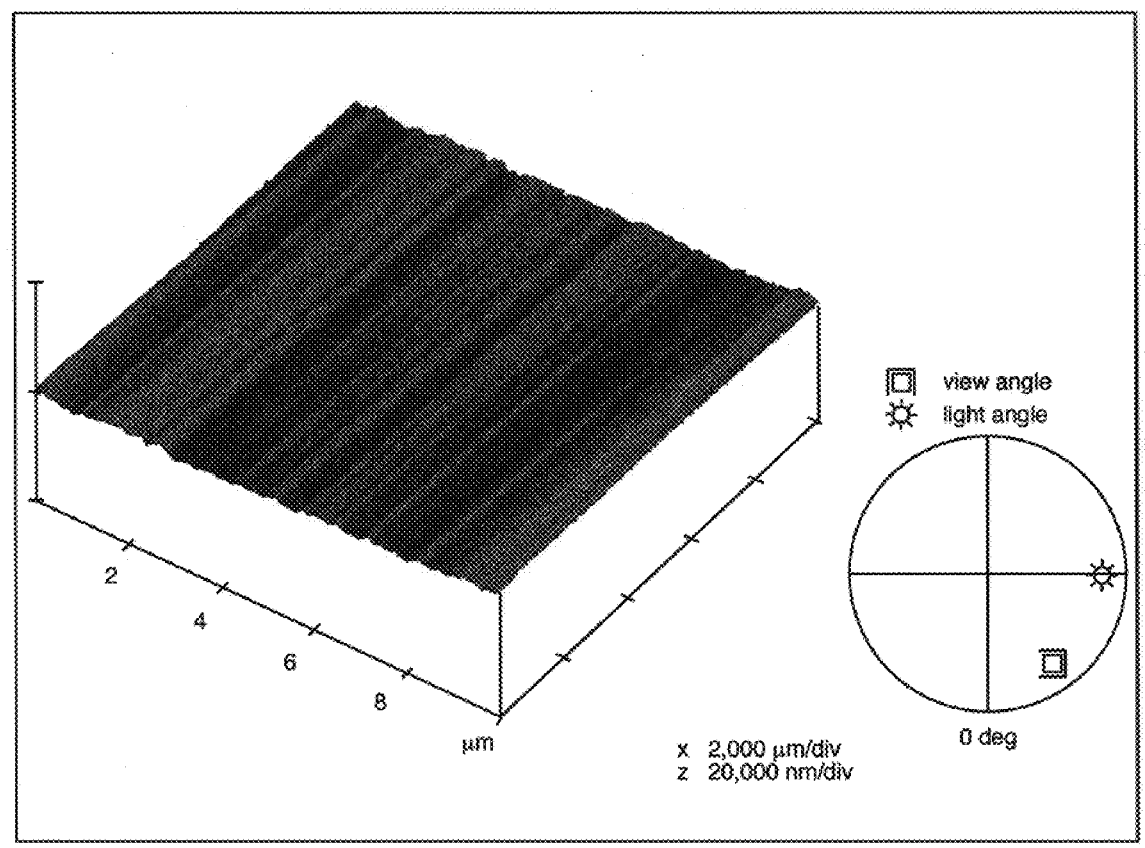
FIG._ 2B

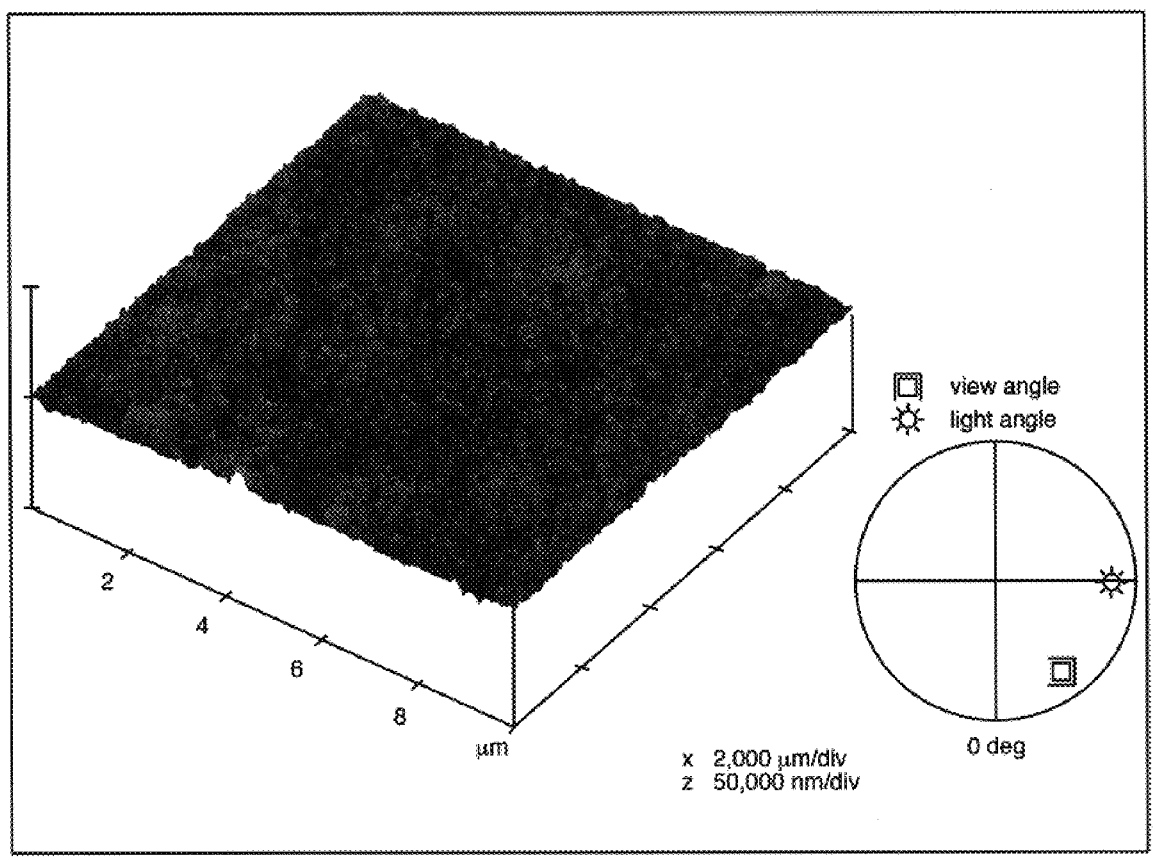
FIG._ 3A

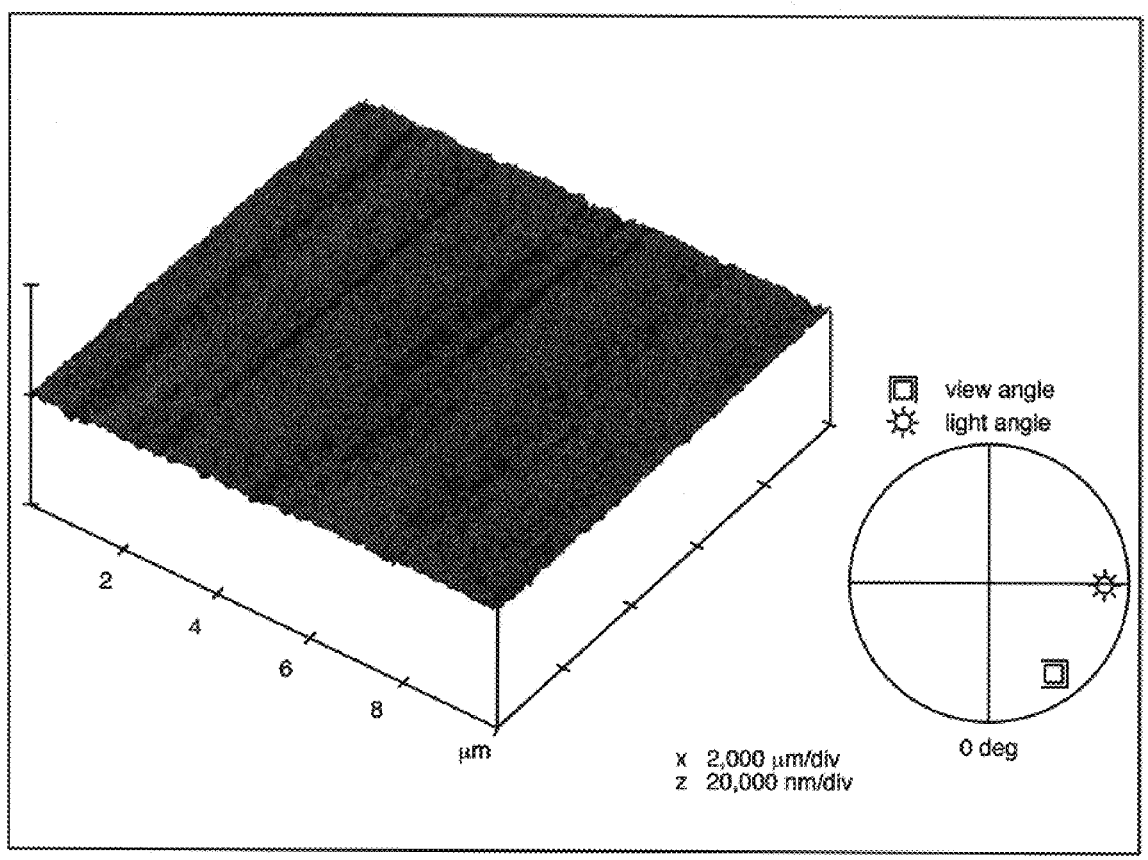
FIG._3B

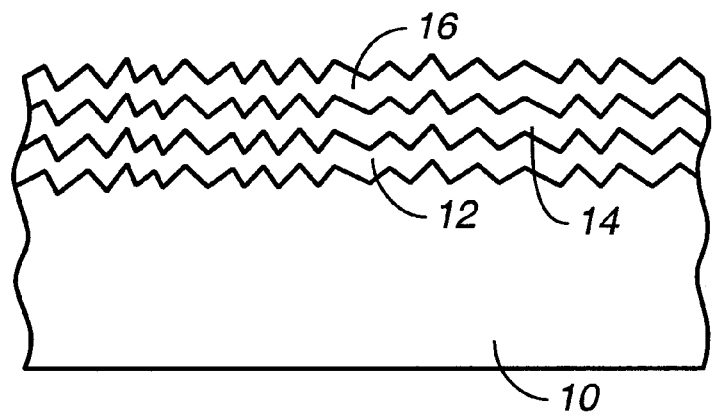
FIG._4
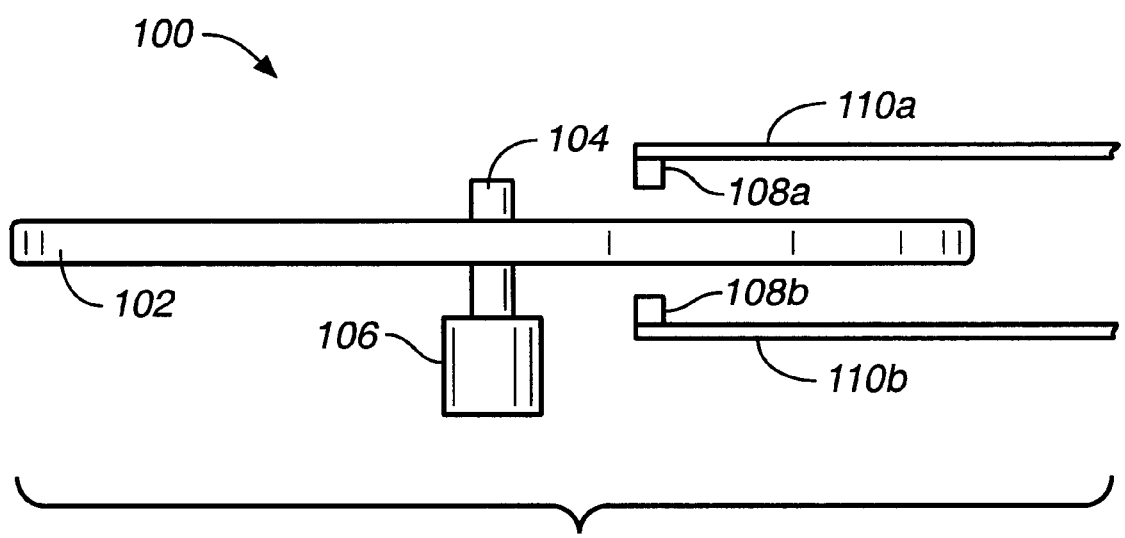
FIG._5

MECHANICAL TEXTURING OF GLASS AND GLASS-CERAMIC SUBSTRATES

BACKGROUND OF THE INVENTION

This invention relates to methods for texturing glass and glass-ceramic substrates and other silica-containing substrates. This invention also relates to slurries used for polishing glass and glass ceramic substrates and other silica-containing substrates. This invention also relates to apparatus for polishing glass and glass ceramic substrates and other silica-containing substrates.

Magnetic disks are typically manufactured by the following process.

1. First, an aluminum alloy substrate is electroless plated with a hard material such as NiP.

2. The NiP is polished and then textured. In one type of process, the NiP is mechanically textured to form a set of grooves in the NiP.

3. An underlayer such as Cr, a magnetic alloy such as a Co alloy, and a protective carbon overcoat are then sputtered onto the textured NiP, in that order.

4. A lubricant layer is applied to the protective overcoat.

Of importance, the texture in the NiP affects the magnetic properties of the Co magnetic alloy. In particular, the texture in the NiP causes anisotropic magnetic characteristics in the Co alloy which are beneficial. For example, the coercivity of the magnetic film is increased in the direction of the texture grooves (which is substantially parallel to the data tracks in the magnetic film). This helps to increase the data storage density of the magnetic disk.

Another type of magnetic disk uses a glass or glass ceramic substrate. Of importance, glass and glass ceramic are harder and more rigid than aluminum. Thus, a magnetic disk comprising a glass substrate is less susceptible to wobbling in response to rotation at high rotational velocities. The glass substrate is also less susceptible to "head slap" or "non-operating shock" which is a severe failure mode due to the continual motion of the disk drive during travel, assembly and delivery. A magnetic disk comprising a glass substrate is typically manufactured by the following process:

1. A glass substrate is subjected to a grinding process to ensure that the substrate is substantially flat. This is accomplished by using a grinding stone embedded with diamond particles, or by using a slurry comprising large abrasive $Al_2O_3$ particles. This process typically leaves the glass substrate with cracks, fractures or other mechanical defects that are subsequently removed by polishing.

2. The glass substrate is then subjected to a coarse polishing step, during which between 20 and 50 $\mu$m of the glass is removed. This polishing step is accomplished using a slurry comprising large (2 to 3 $\mu$m) $CeO_2$ particles. One can remove about 1 $\mu$m/minute of glass using $CeO_2$ particles. During this step, the glass substrate is made smoother, and many of the mechanical defects such as cracks and fractures are removed.

3. Thereafter, the glass substrate is subjected to a fine polishing step, during which between 2 and 5 $\mu$m of the glass is removed. This polishing step is typically accomplished using smaller (0.5 to 1 $\mu$m) $CeO_2$ particles. At the conclusion of this step, the surface roughness of the glass substrate has a Ra of about 3Å. ("Ra" is a well-known measure of surface roughness.)

4. Thereafter, an underlayer such as NiAl (e.g. 60 to 80 nm thick), a magnetic Co alloy, and a protective overcoat (e.g. hydrogenated carbon) are sputtered, in that order, on the polished glass substrate.

5. A lubricant layer is applied to the magnetic disk.

Although diamond is harder than $CeO_2$ particles, typically $CeO_2$ particles polish glass more rapidly than diamond. This is because the mechanism by which $CeO_2$ polishes glass is a chemical-mechanical process. The $CeO_2$ reacts with the glass, and forms a hydrated type of material on the glass surface that can easily be abraded away. In contrast, the process by which diamond polishes glass is purely mechanical, and is slower. Further, because the process by which diamond abrades glass is mechanical, and fractures the glass, the glass surface at the conclusion of diamond polishing is typically very irregular. Thus, $CeO_2$ is used very often as the polishing agent when polishing glass.

Unlike the manufacturing process using a NiP-coated aluminum substrate and mechanical texturing, the above-mentioned manufacturing process using a glass substrate and $CeO_2$ particles does not result in a texture comprising circumferential grooves. Thus, this process does not enhance the coercivity of the magnetic film along the direction of texture grooves.

Another manufacturing process known in the art comprises the following steps:

1. A glass substrate is subjected to grinding and coarse polishing as described above.

2. A seed layer (e.g. a palladium alloy) is sputtered on the glass substrate.

3. A NiP layer is electroless plated on the seed layer.

4. The NiP layer is then polished and mechanically textured to form texture grooves in the circumferential direction of the substrate.

5. An underlayer comprising Cr, a Co magnetic alloy, and a hydrogenated carbon overcoat are then sputtered, in that order, on the textured NiP layer, 6. A lubricant layer is applied to the hydrogenated carbon overcoat.

This process results in the formation of texture grooves in the circumferential direction. These grooves enhance the coercivity of the Co magnetic alloy in the circumferential direction. However, this manufacturing process requires additional expensive steps, e.g. depositing the seed layer, electroless plating NiP on the seed layer, and mechanically texturing the NiP.

SUMMARY

A method for texturing a glass substrate comprises the step of using a slurry comprising diamond particles (either single crystal or polycrystalline diamond or both) and cerium oxide particles ($CeO_2$). The slurry particles are typically in a liquid such as water. Of importance, we have discovered that a slurry comprising both diamond and $CeO_2$ particles exhibits an increased material removal rate compared to a slurry of only $CeO_2$ particles. We have also discovered that a slurry comprising both diamond and $CeO_2$ particles can be used to form texture grooves in the circumferential direction. In one embodiment, these grooves are used to enhance the magnetic characteristics (e.g. coercivity) of a magnetic film formed on the glass substrate in the circumferential direction. Thus, a magnetic disk in accordance with our invention can exhibit a higher recording density in the direction of the texture grooves.

We have also discovered that a slurry comprising both diamond and $CeO_2$ particles does not leave a damaged surface layer in the glass substrate the way that diamond particles alone would. Thus, our slurry results in an improved surface morphology for the glass substrate.

After polishing and texturing, a seed layer such as Al, Cr, Ti, $Ni_3P$, MgO, C, W, Zr, AlN or NiAl is deposited on the substrate, and a magnetic Co alloy is deposited on the seed layer (e.g. by sputtering). In one embodiment, the circumferential texture of the present invention results in an improved orientation of the magnetic domains of the Co alloy, with a resulting improvement in the recording performance of the magnetic disk. Thereafter, a protective overcoat and lubricant layer are typically deposited on the disk.

A texture in accordance with our invention reduces the number and heights of surface asperities on the disk surface, thus permitting a read-write head to fly closer to the magnetic Co alloy, and permitting correspondingly high recording densities.

The slurry of our invention can be used to texture glass substrates that have been subjected to chemical strengthening. (Chemical strengthening is a process by which ions such as potassium ions are diffused into the glass to create a compressive stress region at the surface of the substrate. This stress region prevents cracks from propagating. As the name of this process implies, chemical strengthening results in a stronger glass substrate.)

The slurry of our invention can be used to texture glass substrates having any of a number of additives, e.g. soda lime glass, borosilicate glass, and glass having other additives.

In another embodiment, our slurry comprising diamond and $CeO_2$ particles is used to texture a glass ceramic substrate , (Glass ceramic is another material that is being used for substrates in magnetic media. As is known in the art, glass ceramic comprises both amorphous and crystalline material.)

In another embodiment, a slurry comprising diamond and $CeO_2$ particles is used to texture other silica-containing materials.

In another embodiment, the slurry comprises colloidal $CeO_2$. The colloidal $CeO_2$ particles can have a size in the range of 10 to 20 nm. Dispersion of the colloidal $CeO_2$ particles can be stabilized by acetate ions or nitrates.

In another embodiment, other Ce-containing materials are used in addition to or in lieu of $CeO_2$. The cerium within these materials is typically in its highest oxidation state (i.e. a valence state of 4). Examples of such materials include soluble cerium salts, e.g. ammonium cerium (IV) nitrate (i.e. $(NH_4)_2Ce(NO_3)_6$), ammonium cerium sulfate (i.e. $(NH_4)_4Ce(SO_4)_4$), cerium (IV) perchlorate (i.e. $Ce(ClO_4)_4$), cerium (IV) sulfate (i.e. $Ce(SO_4)_2$), cerium (IV) nitrate (i.e. $Ce(NO_3)_4$), cerium (IV) fluoride (i.e. $CeF_4$) or cerium hydroxide (i.e. $Ce(OH)_4$).

In another embodiment, particles such as $ZrO_2$, $ThO_2$, $TiO_2$ and $Fe_2O_3$ can be used in addition to or in lieu of $CeO_2$. These particles are typically mixed with diamond particles to form a slurry in accordance with our invention. These oxides improve the stock removal rate compared to the removal rate for diamond particles.

In another embodiment, particles such as $SnO_2$, $Cr_2O_3$ and $Al_2O_3$ can be used in addition to or in lieu of $CeO_2$.

In another embodiment, other hard particles such as SiC, $B_4C$, AlB, TiC, $W_2C$ or other hard particles can be used in addition to or in lieu of diamond.

BRIEF DESCRIPTION OF THE DRAWINGS

FIGS. 1A and 1B schematically illustrate apparatus used in conjunction with a slurry in accordance with our invention.

FIGS. 2A and 2B are atomic force microscope ("AFM") photographs of a glass substrate before and after polishing with a slurry in accordance with our invention, respectively.

FIGS. 3A and 3B are AFM A photographs of a glass ceramic substrate before and after texturing with a slurry in accordance with our invention, respectively.

FIG. 4 illustrates in cross section a magnetic disk constructed in accordance with our invention.

FIG. 5 schematically illustrates a disk drive incorporating a magnetic disk in accordance with our invention.

DETAILED DESCRIPTION

A process in accordance with our invention comprises the step of subjecting a glass substrate to a two-step grinding and polishing process as described above. Thereafter, the glass substrate is textured using a novel slurry in accordance with our invention. This slurry comprises both diamond and $CeO_2$ particles in water at room temperature water and a pH between 6 and 8 (e.g. about 7). The slurry can comprise between 0.5 to 30 wt. % $CeO_2$ and between 0.01 to 0.5 wt. % diamond. In one embodiment, polishing is accomplished using conventional apparatus, e.g. EDC 1800 Series or EDC 800 Series polishing/texturing apparatus, manufactured by EDC Corporation of San Jose, Calif. Other apparatus can be used in conjunction with our slurry, e.g. an Oliver Polisher/Texturing machine, manufactured by Oliver Corporation, located in Scotts Valley, Calif. or a Strasbaugh Texturing machine manufactured by Strasbaugh Corporation of San Luis Obispo, Calif. In an embodiment using an EDC 1800 Series machine, the parameters used to polish the glass substrate can be as set forth in Table I below.

TABLE I

| First Step | | Second Step | |
| --- | --- | --- | --- |
| Tape Type | Texwipe TX139K | Tape Type | Mipox FP404 |
| Tape speed (in/min) | 2.0 | Tape speed (in/min) | 2.0 |
| Tape tension (lbs.) | 2.5 | Tape tension (lbs.) | 2.5 |
| Roller type (duro) | 80.0 | Roller type (duro) | 40.0 |
| Roller width (in) | 2.0 | Roller width (in) | 2.0 |
| Spindle RPM | 390.0 | Spindle RPM | 230.0 |
| Spindle direction | CW | Spindle direction | CW |
| Oscillation frequency | 13.3 Hz | Oscillation frequency | 3.75 Hz |
| Texture force (lbs) | 3.0 | Wiping force (lbs) | 1.5 |
| Texture area | 0.552".OD | Wiping area | 0.552".OD |
| Slurry | $CeO_2$/diamond | Lube type | SP407 |
| Slurry rate (ml/sec) | 0.40 | Lube rate (ml/sec) | 1.0 |
| Slurry dispensing mode | pulsating | Lube concentration (%) | 1.0 |
| Texture time (sec) | 25 | Wipe time (sec) | 3.0 |

The parameters set forth in table I are merely exemplary, and other parameters can be used. For example, in lieu of the tape types listed in table I, nylon, rayon or polyester tapes can be used that are woven, non-woven or flock. Different types of rollers can be used. In other embodiments, the spindle RPM for the first and second steps can be 250 and 150, respectively. The oscillation frequency for the first and second steps can be 7 and 3 Hz, respectively. The texture force can be 4 and 3 lbs, respectively. In lieu of lube type SP407, a number of surfactants can be used. In fact, the invention can be practiced using different types of apparatus and different process parameters.

FIGS. 1A and 1B schematically illustrate in plan view and cross section, respectively, texturing machine apparatus used in conjunction with a slurry in accordance with the invention. Referring to FIGS. 1A and 1B, a glass substrate 1 is rotated in a direction 2 while a tape 3 is moved back and forth (direction 4) by reels 5 and 6. Concurrently, tape 3 is moved back and forth in the radial direction (direction 7). A roller 8 pushes tape 3 in a downward direction against substrate 1 during texturing. The slurry in accordance with our invention is introduced between tape 3 and substrate 1.

We performed a set of experiments using different slurries to polish glass substrates as set forth in Table II below:

TABLE II

| Substrate | Slurry Composition | Stock Removal Rate |
|---|---|---|
| 1. Amorphous glass | Diamond (0.4% wt/vol, 0.25 μm particle size) | 0.8 mg/min |
| 2. Amorphous glass | $CeO_2$ (5% wt/vol., 1 μm) plus Diamond (0.4% wt/vol) | 4.24 mg/min |
| 3. Glass ceramic | Diamond (0.4% wt/vol, 0.25 μm particle size) | 0.6 mg/min |
| 4. Glass ceramic | $CeO_2$ (5% wt/vol., 1 μm) plus Diamond (0.4% wt/vol) | 3.08 mg/min |
| 5. Glass ceramic | Diamond (0.4% wt/vol, 0.25 μm particle size) | 0.5 mg/min |
| 6. Glass ceramic | $CeO_2$ (5% wt/vol., 1 μm) plus Diamond (0.4% wt/vol) | 2.64 mg/min |

(As used in the above table, 0.4% wt/vol refers to 0.4 grams of powder per 100 ml of liquid.)

As can be seen in table II, a slurry containing diamond alone removes material at a slow rate compared to a slurry comprising both diamond and $CeO_2$. This is true for both glass and glass ceramic substrates. We have also found that while one can polish glass with $CeO_2$ particles alone, such polishing does not generally result in the formation of texture grooves on the substrate. The combined effect of the diamond and $CeO_2$ particles in the slurry on the resulting substrate morphology is described in Table III, below.

TABLE III

| Substrate | Texture | RMS | Ra | SK | D0.1 | D0.5 | D5 | D50 | D100 |
|---|---|---|---|---|---|---|---|---|---|
| 1 | No | 10.3 | 8.1 | 6.8 | 27 | 38 | 52 | 72 | 103 |
| 2 | Yes | 4.2 | 3.5 | −1 | 3.5 | 5.5 | 9 | 16 | 52 |
| 3 | No | 3.4 | 2.4 | 9.4 | 10 | 13 | 20 | 27 | 52 |
| 4 | Yes | 3.9 | 3 | −7.3 | 5 | 7 | 10 | 15.5 | 46 |
| 5 | No | 4.7 | 3.6 | 4.5 | 13 | 16 | 23 | 32 | 64 |
| 6 | Yes | 4.5 | 3.5 | −4.5 | 14 | 15 | 15 | 22 | 85 |

(As used in the above table, "texture" means the formation of concentric or cross-hatched grooves.)

As mentioned above, Ra is a well-known measure of surface roughness, as is RMS roughness. Both Ra and RMS roughness are in units of angstroms. As seen in Table III above, the RMS and Ra measures of roughness are not affected strongly by the texturing process for glass ceramic substrates.

SK is a texture parameter called "skewness." It represents the extent to which texture is dominated by asperities rising above the substrate surface vs. canyons extending into the substrate surface. (It is desirable to have the roughness dominated by canyons, as it is more difficult to fly a read-write head over a magnetic disk having asperities extending from the surface of the disk.) A change in skewness from positive to negative values implies a reduction in surface asperities (peaks) with a corresponding improvement of glide performance.

The effect of a polishing/texturing process in accordance with our invention is shown in FIGS. 2A and 2B. FIG. 2A is an AFM photograph of a glass substrate prior to texturing in accordance with our invention. FIG. 2B is an AFM photograph of that glass substrate after texturing. Texturing was performed using a slurry comprising water, $CeO_2$ and diamond particles. The slurry comprised 5% wt/vol $CeO_2$ particles having a size of about 1 μm and 0.14% wt/vol diamond particles. As can be seen, prior to texturing, the substrate has a rough isotropic texture, whereas after texturing, the glass substrate comprises parallel texture grooves.

The same effect is produced in a glass ceramic substrate. FIGS. 3A and 3B show a glass ceramic substrate prior to and after texturing, respectively. As can be seen, prior to texturing, the glass ceramic substrate has a rough isotropic texture, whereas after texturing, the substrate comprises parallel texture grooves. The texture grooves are less defined in the glass ceramic substrate of FIG. 3B compared with FIG. 2B. This is not surprising considering the non-uniform distribution of crystalline material within glass ceramic substrates. (In one embodiment, the crystalline material comprises alpha-spudamene, $Li_2O_2SiO_2$, willemanite and garnet.)

The process of the present invention is typically used to manufacture magnetic disks. In one embodiment, the process comprises the steps of:

1. Grinding a glass substrate 10 (FIG. 4) as described in the Background of the Invention portion of this specification;

2. Texturing the glass substrate using a two step $CeO_2$ polishing process and followed with texturing the glass substrate using diamond and $CeO_2$ particles as set forth above;

3. Sputtering an underlayer 12 comprising Cr, Ti, W, Mo or alloys thereof, or NiAl followed by Cr on the substrate (the underlayer typically serves as a nucleation layer for the magnetic alloy, and in one embodiment, controls the crystal growth and enhances the coercivity of the magnetic layer);

4. Sputtering a Co alloy magnetic layer 14 on the underlayer;

5. Sputtering a protective overcoat 16 such as hydrogenated carbon on the Co alloy magnetic layer; and 6. Applying a lubricant layer such as perfluoropolyether to the protective overcoat.

In one embodiment, the texture grooves formed in the substrate result in magnetically anisotropic coercivity characteristics in magnetic layer 14. In particular, the coercivity of the magnetic alloy is enhanced in the direction of the texture grooves, i.e. in the circumferential direction of the disk. Of importance, this increases the data storage density of the magnetic disk.

The texture of our invention provides other benefits as well. For example, the texture reduces the propensity of the read-write head used in conjunction with the disk to collect liquid lubricant or hydrocarbon-based drive contaminants on its trailing edge. The collection of the liquid-based materials by the flying head (called "fly stiction") increases the static adhesion of the head to the disk surface—an undesirable phenomenon. (Such liquid-based materials tend to accumulate at asperities on a disk surface, and are thereafter transferred to the read-write head.) A slurry in accordance with our invention also reduces the number of asperities, and thus reduces the fly stiction problem.

As mentioned above, in lieu of or in addition to $CeO_2$, other particles such as one or more of $ZrO_2$, $ThO_2$, $TiO_2$, $Fe_2O_3$, $SnO_2$, $Cr_2O_2$, or $Al_2O_3$ can be used in the slurry These materials react with and polish silica, although they are not necessarily as efficient as $CeO_2$. These materials are typically used in conjunction with a composition range that is the same as the composition range for $CeO_2$ described above. The diamond particles can be single crystal or polycrystalline diamond. Also, in lieu of or in addition to diamond, SiC, $B_4C$, AlB, TiC, $W_2C$, or other hard abrasives can be used. In one embodiment, the hard abrasive can have a hardness according to the Mohs scale of 8 or larger. These hard abrasives can have the same composition range as the range set forth for diamond, above.

Although one embodiment of the slurry is used at room temperature and has a pH between 6 and 8, other temperatures and pH values can also be used. Also, other materials can be added to the slurry, e.g. surfactants, without departing from the invention.

A magnetic disk in accordance with our invention is typically incorporated into a disk drive, e.g. disk drive 100 illustrated in FIG. 5. Referring to FIG. 5, disk drive 100 comprises a magnetic disk 102 mounted on a spindle 104 which in turn is rotated by a motor 106. A pair of read-write heads 108a, 108b are held in proximity to disk 102 by a pair of suspension arms 110a, 110b, respectively. Read-write heads 108a, 108b are used to read data from or write data to disk 102. Suspension arms 110a, 110b are coupled to an actuator (not shown) which is used to position heads 108a, 108b over desired tracks of magnetic disk 102. Disk 102 has a textured glass or glass ceramic substrate as discussed above. The texturing of the glass or glass ceramic not only enhances magnetic characteristics of the magnetic film of disk 102, but also reduces stiction between disk 102 and heads 108 when heads 108 are at rest on the disk surface (i.e. when the disk drive is turned off).

While the invention has been described with respect to specific embodiments, those skilled in the art will appreciate that changes can be made in form and detail without departing from the spirit and scope of the invention. For example, instead of using a Cr underlayer, an underlayer comprising a Cr alloy, Ti, W, Mo, NiP, NiAl, FeAl, $Ni_3P$, MgO, C, W, Zr or AlN can be used. Alternatively, other embodiments of our invention use no underlayer between the substrate and magnetic layer. In yet another embodiment, a magnetic disk in accordance with our invention can comprise additional layers, e.g. adhesion or other layers.

Also, while one embodiment of a process in accordance with our invention comprises two initial polishing steps prior to texturing with a $CeO_2$/diamond slurry, in another embodiment, the second polishing step is performed using a $CeO_2$ diamond slurry to texture the substrate. In yet another embodiment, the coarse initial polishing step is either omitted or performed with a $CeO_2$/diamond slurry.

While the $CeO_2$ particles are typically between 0.5 and 3 $\mu$m in size, other sizes can be used. In addition, different size diamond particles can be used. Accordingly, all such changes come within our invention.

We claim:

1. A method for texturing a silica-containing magnetic recording medium substrate comprising the steps of abrading the substrate with a slurry, said slurry including diamond and $CeO_2$ particles, said diamond mechanically abrading said substrate but not causing chemical-mechanical polishing of said substrate, said $CeO_2$ particles causing chemical-mechanical polishing of said substrate.

2. Method of claim 1 wherein said substrate comprises silica.

3. Method of claim 2 further comprising forming a magnetic layer on said substrate to thereby form a magnetic recording medium.

4. Method of claim 3 further comprising:
forming an underlayer between said magnetic layer and said substrate; and
forming a protective overcoat over said magnetic layer.

5. Method of claim 2 wherein said substrate is glass or glass ceramic.

6. Method of claim 1 wherein said substrate is a disk-shaped substrate, said method further comprising:
rotating said substrate; and
applying said slurry to a portion of said substrate while said substrate rotates to form texture grooves on said disk-shaped substrate.

7. Method of claim 6 further comprising providing a mechanical structure that pushes said particles against said substrate to texture said substrate.

8. Method of claim 7 wherein said mechanical structure comprises tape that is pushed against said substrate during said rotating of said substrate.

9. Method of claim 1 said method further comprising forming a magnetic layer on said substrate to thereby form a magnetic recording medium.

10. Method of claim 9 further comprising:
forming an underlayer between said magnetic layer and said substrate; and
forming a protective overcoat over said magnetic layer.

11. Method of claim 1 wherein said abrading results in texture grooves on said substrate.

12. Method of claim 11 further comprising forming a magnetic layer on said substrate to form a magnetic recording medium, said texture grooves reducing the stiction exhibited by said magnetic recording medium.

13. Method of claim 12 further comprising:
forming an underlayer between said substrate and said magnetic layer; and
forming a protective overcoat over said magnetic layer.

14. Method of claim 13 wherein said texture grooves are concentric.

15. Method of claim 13 wherein said texture grooves are cross hatched.

16. Method of claim 1 wherein said substrate is flat and planar.

17. A method for polishing and texturing a silica-containing magnetic recording medium substrate comprising the steps of abrading the substrate with a slurry, said slurry including a first material and a second material, said first material comprising one or more of $CeO_2$, $ZrO_2$, $ThO_2$, $TiO_2$, $Fe_2O_3$, $SnO_2$, $Cr_2O_3$ and $Al_2O_3$, said second material comprising one or more of diamond, SiC, $B_4C$, AlB, TiC and $W_2C$, said first material causing chemical-mechanical polishing of said substrate, said second material mechanically abrading said substrate but not causing chemical-mechanical polishing of said substrate.

18. Method of claim 17 wherein said slurry further comprises water.

19. Method of claim 17 wherein at the conclusion of said method, said substrate has texture grooves thereon.

20. Method of claim 19 further comprising the step of depositing a magnetic alloy above said substrate.

21. Method of claim 20 wherein said magnetic alloy exhibits enhanced magnetic coercivity in the direction of the texture grooves.

22. Method of claim 20 wherein said texture grooves are concentric.

23. Method of claim 20 wherein said texture grooves are cross-hatched.

24. Method of claim 20 further comprising the step of forming an underlayer above said substrate prior to depositing said magnetic layer, said method also comprising the step of providing a protective overcoat above said magnetic layer.

25. Method of claim 17 wherein said abrading results in texture grooves on said substrate.

26. Method of claim 25 further comprising forming a magnetic layer on said substrate to form a magnetic recording medium, said texture grooves reducing the stiction exhibited by said magnetic medium.

27. Method of claim 26 further comprising:
   forming an underlayer between said substrate and said magnetic layer; and
   forming a protective overcoat over said magnetic layer.

28. Method of claim 26 wherein said texture grooves are concentric.

29. Method of claim 26 wherein said texture grooves are cross hatched.

30. Method of texturing a silica-containing magnetic recording medium substrate comprising the steps of abrading the substrate with a slurry, said slurry including particles of a first material and particles of a second material, said first material comprising cerium in a form having a valence of 4, said particles of said second material having a hardness of at least 7 on the Mohs scale, said particles of said first material causing chemical-mechanical polishing of said substrate, said particles of said second material mechanically abrading said substrate but not causing chemical-mechanical polishing of said substrate.

31. Method of claim 30 wherein said cerium is in the form of an oxidized salt of cerium.

32. Method of claim 30 wherein said cerium is in a form selected from ammonium cerium (IV) nitrate, ammonium cerium (IV) sulfate, cerium (IV) perchlorate, cerium (IV) sulfate, cerium (IV) nitrate, cerium (IV) fluoride and cerium (IV) hydroxide.

33. Method of polishing a silica-containing magnetic recording medium substrate comprising abrading said substrate with a slurry, said slurry comprising a first group of particles made from a first material and a second group of particles made from a second material which is different from said first material, said first material causing chemical mechanical polishing of said substrate, said second material mechanically abrading said substrate but not causing chemical-mechanical polishing of said substrate.

34. Method of claim 33 wherein said substrate is a disk-shaped substrate, said method further comprising:
   rotating said substrate; and
   applying said slurry to a portion of said substrate while said substrate rotates to form texture grooves on said disk-shaped substrate.

35. Method of claim 34 further comprising providing a mechanical structure that pushes said particles against said substrate to texture said substrate.

36. Method of claim 35 wherein said mechanical structure comprises tape that is pushed against said substrate during said rotating of said substrate.

37. Method of claim 35 further comprising:
   forming an underlayer between said magnetic layer and said substrate; and
   forming a protective overcoat over said magnetic layer.

38. Method of claim 33 further comprising forming a magnetic layer on said substrate to thereby form a magnetic recording medium.

39. Method of claim 33 wherein said abrading results in texture grooves on said substrate.

40. Method of claim 39 further comprising forming a magnetic layer on said substrate to form a magnetic recording medium, said texture grooves reducing the stiction exhibited by said magnetic recording medium.

41. Method of claim 40 further comprising:
   forming an underlayer between said substrate and said magnetic layer; and
   forming a protective overcoat over said magnetic layer.

42. Method of claim 40 wherein said texture grooves are concentric.

43. Method of claim 40 wherein said texture grooves are cross hatched.

* * * * *